Figure 1:
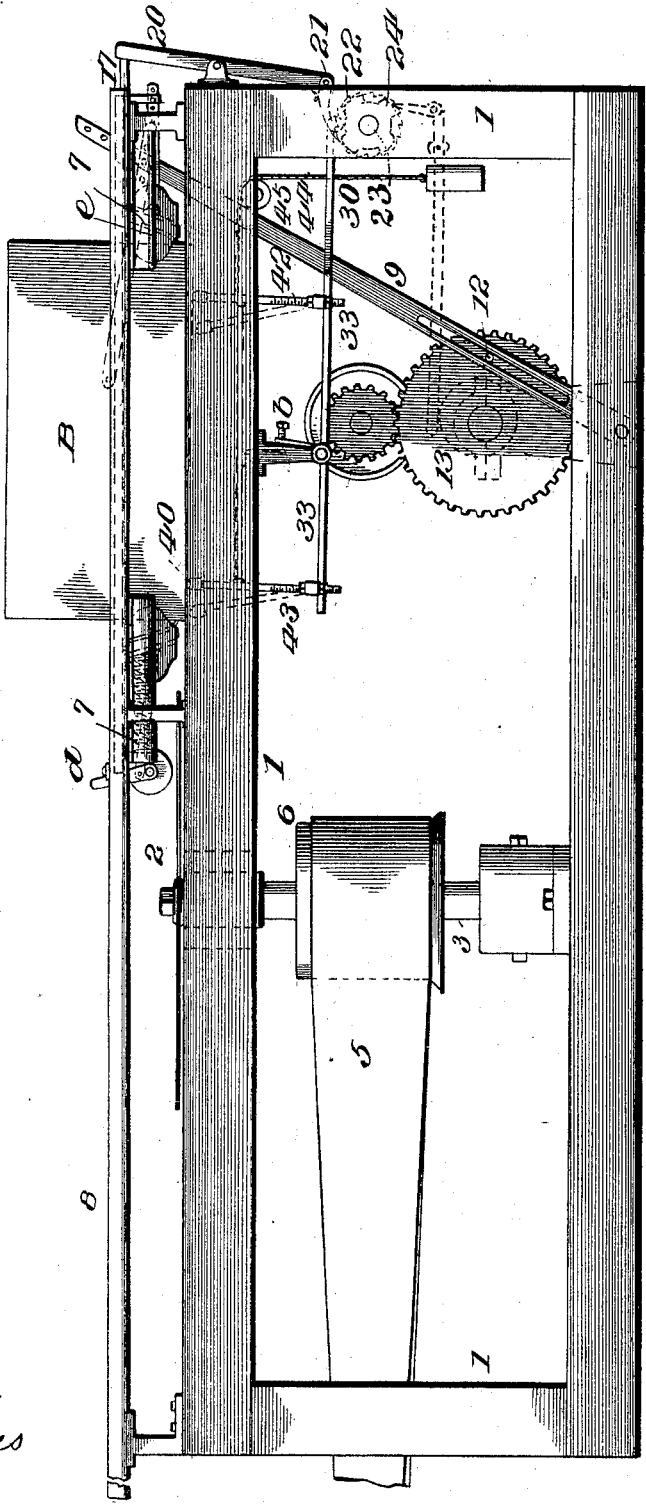

(No Model.) 2 Sheets—Sheet 1.

E. H. KRUGER.
SHINGLE SAWING MACHINE.

No. 606,422. Patented June 28, 1898.

Witnesses
Jno Minnie
C. K. Davies

Inventor
E. H. Kruger
By
W. H. Bartlett
Attorney (No Model.) 2 Sheets—Sheet 2.
E. H. KRUGER.
SHINGLE SAWING MACHINE.
No. 606,422. Patented June 28, 1898.
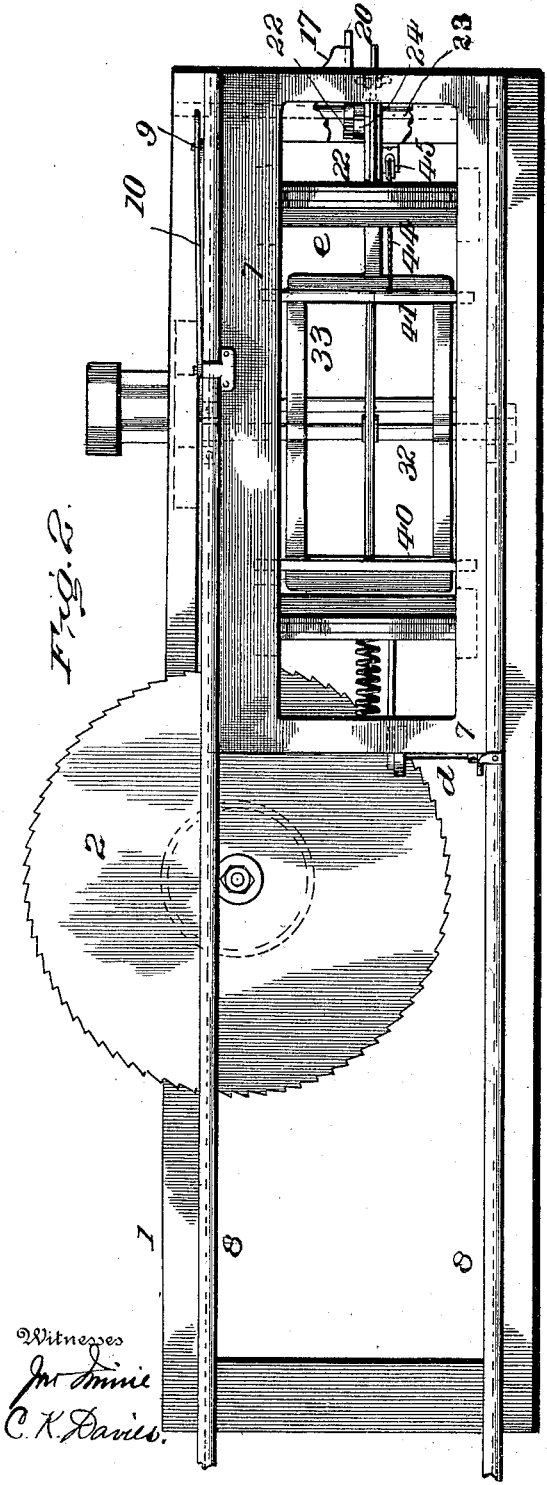

UNITED STATES PATENT OFFICE.

EDWARD H. KRUGER, OF ELIZABETH CITY, NORTH CAROLINA.

SHINGLE-SAWING MACHINE.

SPECIFICATION forming part of Letters Patent No. 606,422, dated June 28, 1898.

Application filed December 27, 1897. Serial No. 663,618. (No model.)

*To all whom it may concern:*

Be it known that I, EDWARD H. KRUGER, residing at Elizabeth City, in the county of Pasquotank and State of North Carolina, have invented certain new and useful Improvements in Shingle-Sawing Machines, of which the following is a specification, reference being had therein to the accompanying drawings.

This invention relates to machines for sawing shingles.

The object of the invention is to produce a machine in which a shingle block or bolt may be fed lengthwise to a horizontal saw from a tilt-table; also, to improve the construction of the tilt-table and the carriage and connections of a machine of this class.

There is an advantage in sawing shingles as nearly lengthwise of the grain of the wood as possible, both in the ease of sawing and in the quality of the product. There is also advantage in sawing (with a horizontal saw) the shingle from the lower face of the block by moving the block from a tilt-table, inasmuch as the downward feed of the block can be effected by gravity, and as the position of the tilt-table determines the thickness of the shingle shingles sawed from a tilt-table are as a rule more even in thickness than such as are sawed by a machine in which the shingles are gaged by a feed sidewise instead of downward.

I secure many of the advantages of the best-known shingle production by the simple machine about to be described.

Figure 1 is a side elevation showing all the essential parts of the machine in parts broken and partly in dotted lines; Fig. 2, a plan of the machine. Fig. 3 is a perspective view of the tilt-table. Fig. 4 is a cross-section of the carriage; Fig. 5, a perspective view of the movable dog-bar, and Fig. 6 a detail section of the block 43 and connections.

The frame 1 is of usual rectangular form and may be of wood or metal. The saw 2 is supported on a vertical arbor 3, which arbor runs in any usual bearing and is driven by suitable means, as by a belt 5, running over pulley 6.

The carriage 7 runs in or between tracks 8 and may be propelled by means of a driving-lever 9, connected to the carriage by pitman 10. The lever 9 is moved by crank-pin 12, working in a slot in the lever, said crank-pin moving with its wheel 13, driven by a train of gearing well known in this art. The pitman 10 can be connected to lever 9 at different points near the upper end of said lever, as by hooking into one of several holes, so that the sweep of a longer or shorter leverage will give a longer or shorter travel to the carriage, or the pitman may be disconnected, in which case the carriage may be moved back and forth by hand in the tracks or ways. In its movement away from the saw the carriage or a projection 17 on the carriage strikes a pivoted lever 20 at the end of the frame. This lever 20 carries near its lower end a pawl 21, which pawl engages a ratchet-wheel 22 on shaft 23, which shaft also carries a cam-plate 24, on which cam-plate the tilt-bar 30 of the tilt-table is supported.

The rotating cam or plate 24 has alternate elevations and depressions. The tilt-table shown is a mere skeleton construction consisting of a rigid frame 33, resting on a fixed fulcrum-bar 32, which fulcrum-bar is supported in suitable hangers from the frame. The tilt-bar 30 is an extension of the heavier end of frame 33 and rests by an antifriction device 35 on the rotating cam 24, so that the step-by-step rotation of said cam alternately lifts or drops the end of tilt-bar 30, thus alternately lowering and raising the end of frame 33, to which the tilt-bar is attached.

The cam 24 can be made with any convenient number of elevations and depressions, and the pawl-and-ratchet mechanism should shift this cam so as normally to change or tilt the table with each return of the carriage. The dogging mechanism is operated in any usual way to drop the bolt or block B onto the tilt-table at each return of the carriage to its position away from the saw, as is common in this art.

The block-supporting bars 40 41 of the tilt-table are directly under the position of block B in the carriage when the carriage is run back from the saw, and the undogging of the block permits it to drop on these bars, which are parallel with frame 33, and the block is dogged in that position. The effect of the bars is the same as if the bars were connected by a plane surface. Hence such a device is usually known in the art as a "tilt-table," whether it has a table-surface or not.

It will readily be understood by people skilled in the art that when bar 40, which is next the saw, is in depressed position and bar 41 is raised the end of the block next the saw will form the shingle-butt and the end farthest from the saw will form the shingle-point when sawed in the usual way and that the tilt-table will not interfere with the forward movement of the carriage 7, which supports the block; but when the position of the bars is reversed, as indicated in Fig. 1, the bar 40 projects so high that if it did not yield it would interfere with the forward movement of the carriage. To overcome this difficulty, I support the bars 40 and 41 on rods, links, or uprights 42 42, which rods pass through holes in blocks 43, the blocks 43 being pivoted on horizontal pivots at the corners of the frame 33. The upright rods 42 are preferably screw-threaded and pass loosely through blocks 43, nuts above and below said blocks 43 serving to adjust the height of the bars 40 41 above frame 33, thereby determining the thickness of the shingle. The blocks 43 being pivoted permit the rocking of uprights 42 out of perpendicular, thus lowering the top bars or working surface of the tilt-table, so that the butt of the shingle can pass over bar 40.

The bars 42 are braced by a light frame $a$, so as to maintain their relative position. The feed of the carriage serves to depress bar 40 by moving the shingle-bolt against it whenever the movement would otherwise be obstructed by said bar.

A cord, chain, or strap 44 is connected to frame $a$, or in any other suitable way connected to the uprights 42, and passes over pulley 45 on the frame, and so to weight W. This draw-weight W serves to raise the uprights after they have been depressed by the forward movement of the carriage and shingle-block. The operation of such a draw-weight is common and well understood.

Preferably the weight W pulls the uprights a little beyond the perpendicular, as in Fig. 1. A set-screw $b$, passing through a projection from the fulcrum-bar 32, serves as a stop against which an abutment $c$ on the frame $a$ rests to prevent weight W from drawing the uprights too far. The slight incline of the uprights in opposite direction from that in which they yield as the carriage moves toward the saw gives solidity to the table-surface when the shingle-bolt drops on it.

The automatic dogging mechanism is indicated at $d$ and may be of any usual construction. As the saw has a tendency to press the shingle bolt or block back against the forward push of the carriage, it is quite easy to hold a block in a carriage of this kind, the thrust of the block being toward the dogs in head-block $e$.

Head-block $e$ is a movable cross-piece on the carriage, said cross-piece having end grooves $f$, which grooves embrace flanges $i$ on the carriage. The head-block may thus be moved along in the carriage to adapt the machine for sawing blocks or bolts of different lengths. When moved, the head-block can be fastened to the carriage by pins in holes $k$ or in other suitable manner. As shingles are sawed from bolts of standard lengths, varying two or four inches, it will only be occasionally that the head need be adjusted, as from twenty-inch to twenty-four inch shingle-bolts.

It is sometimes desirable to cut two butts or two points in succession from the same end of the shingle-bolt. This may be readily effected by disengaging pawl 21 from ratchet 22 by hand as the machine approaches the shifting position, the position of the operator being convenient for such manipulation.

In place of bars 40 and 41 extending entirely across the tilt-frame the central part $r$ of such bars may be journaled or pivoted rollers, which will permit an easier movement of the shingle-block and prevent binding.

In place of lever 20 being operated by the carriage it may be located below the carriage and operated by a cam, as indicated in dotted lines, Fig. 1.

I do not confine myself to precise constructions, but believe my invention to be as broad as my claims.

What I claim is—

1. In a shingle-sawing machine, a horizontal saw, a traveling carriage moving in horizontal ways toward and from the saw, means for grasping a block in said carriage at the ends and in the line of movement of the carriage toward and away from said saw, and a tilt-table having a block-supporting surface constructed to yield independently of the tilting movement, all combined substantially as described.

2. In a shingle-sawing machine, a horizontal saw, a reciprocating block-carriage having holding-dogs at the end of the carriage toward the center of the saw and at the opposite end thereof, and a tilting table under such carriage, having a block-support pivoted thereto, and in position to swing toward the saw to permit the passage of a shingle projecting below the normal plane of the block-support, all combined substantially as described.

3. In a shingle-sawing machine, a horizontal saw, a horizontally-reciprocating block-carriage and means for holding the shingle bolt or block therein, a tilt-table under the retracted position of said carriage, and a block-support carried by links pivotally connected to the tilt-table, and movable out of perpendicular position, to permit a depression of the block-support independently of the tilting movement, all combined substantially as described.

4. In a shingle-sawing machine, the tilt table or frame, a block-support connected to said table by pivoted links which may swing under the forward movement of the block to depress such support, and means for restoring the block-support to normal position, all combined.

5. In a shingle-sawing machine, the tilt frame or table, the block-supports connected to said frame so as to swing toward the saw independently of the tilting movement of the frame, and a weight and connections acting to restore said block-supports to normal position, all combined substantially as described.

6. In a shingle-sawing machine, the pivoted tilt-frame, the links pivotally connected thereto in position to swing out of the perpendicular, toward the saw, to depress the block-supports carried by said links, and a stop serving to limit the swing of the links, all combined substantially as described.

7. In a shingle-sawing machine, the tilt-frame and means for tilting it, the block-supports connected to said frame by pivoted links constructed to yield by swinging toward the saw to depress the block-supports independently of the tilting movement, a draw-weight connected to said links, and an adjustable stop to limit the movement of the draw-weight, all combined.

8. In a shingle-sawing machine of the character described, the saw and carriage, the tilt-frame having links pivotally connected thereto in position to swing toward the saw, the block-supports carried by said links and depressed by swinging the links to a normal position slightly inclined away from the saw, and means for supporting the links in such position, all combined substantially as described.

9. In a shingle-sawing machine, the horizontal saw, the reciprocating carriage, the tilt-table having its vertically rising and falling ends in the direction of movement of the carriage toward and away from said saw, swinging links connected to said table, (bearing the block-supports) in position to yield by swinging the direction of the travel of the carriage, and means for adjusting the block-supports vertically, all combined substantially as described.

10. In a shingle-sawing machine, the horizontal saw, the horizontally-reciprocating carriage, the tilt-table, the block-support carried by said table and yielding under the forward movement of a shingle-butt independently of the tilting movement, and an antifriction device carried by said block-support, all combined substantially as described.

In testimony whereof I affix my signature in presence of two witnesses.

EDWARD H. KRUGER.

Witnesses:
W. A. BARTLETT,
A. BURGESS.